US010455011B2

(12) United States Patent
Kendall

(10) Patent No.: US 10,455,011 B2
(45) Date of Patent: *Oct. 22, 2019

(54) SUPPORTING HETEROGENEOUS ENVIRONMENTS DURING CODE DEPLOYMENT

(71) Applicant: Amazon Technologies, Inc., Seattle, WA (US)

(72) Inventor: Cory Barrett Kendall, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,507

(22) Filed: Jan. 26, 2018

(65) Prior Publication Data

US 2018/0152509 A1 May 31, 2018

Related U.S. Application Data

(63) Continuation of application No. 14/740,993, filed on Jun. 16, 2015, now Pat. No. 9,882,976.

(51) Int. Cl.
*H04L 29/08* (2006.01)
*H04L 12/911* (2013.01)

(52) U.S. Cl.
CPC ........ *H04L 67/1031* (2013.01); *H04L 47/748* (2013.01); *H04L 47/822* (2013.01)

(58) Field of Classification Search
None
See application file for complete search history.

(56) References Cited

U.S. PATENT DOCUMENTS

| 7,299,294 | B1 | 11/2007 | Bruck et al. |
| 2009/0259736 | A1 | 10/2009 | Chang et al. |
| 2014/0006578 | A1 | 1/2014 | Kohn et al. |

OTHER PUBLICATIONS

Jeroen, "HTTP statuscode to retry same request," Stack Overflow Community, Jul. 25, 2013 [retrieved Mar. 2, 2017], https://stackoverflow.com/questions/17862015/http-statuscode-to-retry-same-request, 3 pages.

*Primary Examiner* — Scott B Christensen
(74) *Attorney, Agent, or Firm* — Davis Wright Tremaine LLP

(57) ABSTRACT

When servers hosting a website are under some form of deployment activity (e.g., a software update being in mid-deployment), the resources requested may not be available from all servers hosting the website. In such mid-deployment edge cases, the server would return an error message in response to the request. According to an application employing redirect instructions via a load balancer, a redirect function (such as a Hypertext Transfer Protocol (HTTP) status code 302) may be configured to redirect a client request to the same location as an initial request, via a load balancer, in order to provide the client with multiple attempts of reaching an updated host (e.g., a server hosting a resource based on a recent deployment), without having to receive error codes or otherwise fail to receive the requested resource.

20 Claims, 7 Drawing Sheets

SUPPORTING HETEROGENEOUS ENVIRONMENTS DURING CODE DEPLOYMENT

CROSS-REFERENCE TO RELATED APPLICATION

This application is a continuation of U.S. patent application Ser. No. 14/740,993, filed on Jun. 16, 2015, entitled "SUPPORTING HETEROGENEOUS ENVIRONMENTS DURING CODE DEPLOYMENT," the content of which is incorporated by reference herein in its entirety.

BACKGROUND

Applications including software services and web services ("services") provide a way to access software functionality that can be reused for a variety of purposes by different clients. Information technology administrators, employing such services on a network, will need to periodically deploy upgrades, updates, or new hosts in order to maintain up-to-date systems and files. Such system management may include enterprise-wide administration of distributed systems including computer systems. Deployment updates may be disruptive processes that may cause session interruptions or disconnections, server errors, browser errors, and other problems that cause the client to be unable to receive requested resources or receive outdated files.

For example, during system deployment, such as deploying website software, some hosts (e.g., servers) may maintain stale files that are stored on hosts and have not been updated by the deployment. This can cause errors when a client transmits a request, via a load balancer, which is forwarded to a host that has not been updated by the deployment. Common methods of avoiding client errors during system updates/deployments include pre-seeding deployment artifacts into a content delivery network (CDN) in order to offload deployment problems to the CDN by serving both updated and stale assets at the same time. Other methods include performing deployments in a split-architecture, such as deploying updates to a percentage of a fleet of servers, while the remaining stale hosts are offline, and then performing the same action to the other percentage of the servers. Subsequently, systems deploy updates to newly spun-up hosts before removing the stale hosts from the network. However, these methods of system deployments and updates may cause browser errors and are heavily resource intensive and, generally, are cumbersome to administer.

BRIEF DESCRIPTION OF THE DRAWINGS

Various embodiments in accordance with the present disclosure will be described with reference to the drawings, in which.

DETAILED DESCRIPTION

Figure 1:
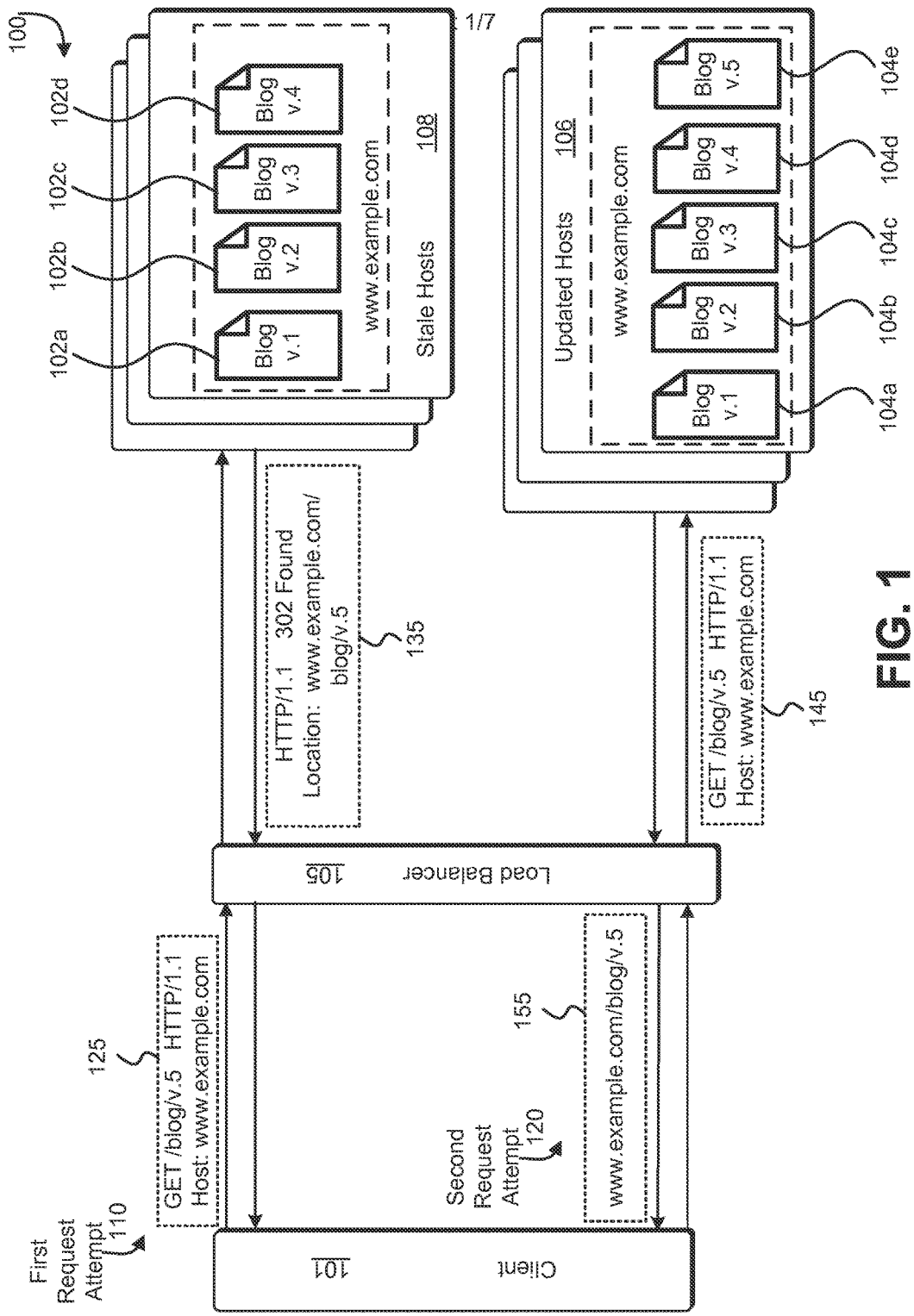
FIG. 1 is an illustrative example of an environment disclosing a client redirect flow in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and computer-readable mediums configured to use redirect instructions to ensure that a request for a resource is completed without causing a client or server error during system deployments. For example, uniform resource identifiers (URIs) and other references to computing resources (generally "resource locators") are redirected, via a load balancer, to enable access to a resource using Hypertext Transport Protocol (HTTP) status code redirects. The techniques described herein are generally applicable to electronic requests that require resources from a server, or of a fleet of servers, during a deployment or while updating the servers.

The software deployment process may include any of the activities involved in making a software application available, and as such, software deployment may mean many things in many different circumstances. For example, software deployment may include releases, installation, activation, adapting, and updating software components in order to provide the necessary resources and components for customer site (e.g., website hosted on a fleet of servers). In deployment, an entity may deploy an application, causing the computer-readable instructions that define the application to be sent to the computer system. The application may utilize the infrastructure of the computer system including hardware and software resources in its operation.

Unlike conventional systems that include pre-seeding deployment artifacts or deploying updates to a percentage of a fleet of servers, embodiments of the present disclosure enable methods of avoiding a browser having to receive error messages and requiring a user of the client to enter a new request (e.g., re-enter a URI) into the browser. When a client first contacts a server and requests a document, the server returns a redirect instruction that is configured to redirect the client when the requested document is unavailable at the server. The redirect instruction directs the client to the same URI as the original request. This redirect pattern continues until the client successfully reaches a server with the requested resource.

A client browser running on a user-device may transmit a request to a server for a resource; for example, a user, via a web browser, may transmit a request for a web page to servers hosting a website. When the servers hosting the website are under some form of deployment activity (e.g., a software updated), the web page may not be available from all servers. The redirect instruction may be an HTTP redirect function that is configured to redirect a client request to the same location as an initial request, via a load balancer, in order to cause the client to make multiple attempts of to reach an updated host (e.g., a server hosting a resource based on a recent deployment), without having to receive error codes or otherwise fail to receive the requested resource. For example, multiple servers in a fleet of servers, such as servers of a content delivery network (CDN), may be configured to execute redirect instructions, such that, the load balancing of the requests may cause several requests to be met with redirects until a load balancer redirects the requests to a server that has the resource.

As modern browsers inherently respond to redirect instructions (e.g., a browser will automatically follow an HTTP status code 302 Found redirect instruction), a load balancer operably interconnected to multiple servers hosting a resource may be configured to transmit redirect responses from a server until the resource is found on an updated or recently deployed server in order to bypass error codes using self-redirect instructions. Self-redirect functions (e.g., redirect target function, duplicate URL instructions, URL redirection, URL forwarding, etc.) are generally considered to be a problem, as such functions cause redirect loops (causing a URL to redirect back to itself leading to an infinite sequence of redirects). However, the self-redirect functions/instructions described and depicted herein are redirected via a load balancer to additional host servers serving the requested resource.

FIG. 1 is an illustrative example of an environment 100 disclosing a client redirect flow from a client to a host server via a load balancer of a network in accordance with at least one embodiment. As will be appreciated, although a network environment 100 is used for purposes of explanation, different environments may be used, as appropriate, to implement various embodiments.

As described herein, the deployment of the computing resource is specified by a provisioning policy (such as a deployment of updated information, resources, or bringing additional host servers or other components online), or other such policy used for updating, upgrading, or otherwise changing resources and/or servers of a network. The deployment of the computing resource includes the configuration of the computing resource within a computing environment and the interaction of the computing resource with said environment. The configuration may set forth or prescribe the utilization of the computing instance of the resources of the computing environment or the role of the computing instance. The deployment may, for example, specify the tasks to be provided to the computing instance for processing, a type, or size of a storage volume to be attached to the computing instance or a subscription of the computing instance to a load balancer for the distribution of tasks. The deployment of the computing resource may be degraded as a result of the failed completion of a supplementary operation, for example, only a percentage of the resources hosted by a host server may receive the specified updates from the deployment. In such a case, the host server may be unable to fulfil a client request during a mid-period deployment.

A computer system entity, user, or process may connect, via a client 101, to a computer system content delivery network (CDN) (not shown), which may request access to computer system content, such as the files 102a-d and/or files 104a-e hosted on servers 106 and 108. Host 108 is a stale host including stale files 102a-102d, wherein the stale host and/or stale files have not been updated or affected by the deployment. Host 106 is an updated host including updated files 104a-104e, wherein the updated host and/or updated files have been affected by the deployment. For example, files 102a-102d on host 108 include four versions of a blog; blog version 1 (102a), blog version 2 (102b), blog version 3 (102c), and blog version 4 (102d). However, the updated host 106 includes five files, versions 1-5, where blog version 5 (104e) is the updated file requested by the user In some embodiments, the command or commands to request access to the computer system content delivery service may originate from an outside computer system and/or server, or may originate from an entity, user or process on a remote network location, or may originate from the computer system, or may originate from a user of the computer system client device, or may originate as a result of a combination of these and/or other such objects.

The client 101 may connect to the hosts 106 and/or 108 via a load balancing system (e.g., a load balancer). A load balancer 105 may be a device (e.g., physical computer system or a virtual computer system provided by a virtual computer system service) that is configured to utilize one or more load balancing techniques (e.g., round robin and variations thereof), to distribute requests from the clients. In this example, the load balancer is configured to facilitate communication to one of a plurality of physical appliances or virtual hosts. It should be noted, however, that capabilities of the load balancer may be incorporated into one or more other computing resources of the other and/or both of the client side systems and the computing resource service provider. For example, one or more clients may have a load balancing application that performs load-balancing functions. Thus, for a client to submit a request to server, the client device may address the request to an Internet protocol (IP) address of the load balancer 105, which may forward the request to an appropriate host server, receive any responses from a host server, and forward responses back to the client (e.g., original requestor). The load balancer 105 may be configured to distribute workloads across multiple computing resources (e.g., computers, computer clusters, network links, central processing units, disk drives, etc.). Aiming to optimize resource use, maximize throughput, minimize response time, and avoid overloading any single resource, load balancing is generally performed by dedicated hardware and/or software, such as a multilayer switch or a Domain Name System server process.

A human user and/or an automated-agent may control (e.g., via user input and/or automated instructions) a client 101, such as a web browser or application, and transmit a first request 110 for a resource. For example, the client 101 may transmit a request message 125 to a server with a request for a specific resource, content, information or the like using Hypertext Transfer Protocol (HTTP) or other appropriate protocols. The request message 125 may be an electronic request message submitted over the Internet via a load balancer 105 and is forwarded, from the load balancer, to a server, such as hosts 106 and/or 108 for processing.

For example, the client 101 may transmit one or more HTTP requests to the load balancer 105 of the service, which in turn forwards the client request to the specified host (e.g., in request 125, the host is identified as www.example.com). The first request attempt 110 includes a client transmitting a request message 125, which is a request to the host server for a resource (e.g., blog version 5) located at a host (e.g., stale host 108) supporting the website www.example.com (e.g., the full request 125: GET/blog/v.5 HTTP/1.1, Host: www.example.com). However, stale host 108 only maintains resources 102a-102d, which are older or stale versions of the requested resource For example, the request message is requesting blog version 5 (i.e., /blog/v.5); however, the stale host 108 only maintains copies of versions 1, 2, 3, and 4.

The stale hosts (e.g., a frontend or backend server) 108 may provide a response 135 including a location (e.g., URI), which invites (e.g., instructs) the client 101 to transmit a second or next request to a redirected location, where the redirected location according to example embodiments is the same location as the original location. For example, HTTP response status code 302 Found is a common way of performing uniform resource identifier (URI)/uniform resource locator (URL) redirection. An HTTP response 135 includes an HTTP status code 302, which will include a URL in the HTTP location header field pointing to a new location, which is returned in response from a server (e.g., stale host 108) in a URL redirection circumstance. In example embodiments, the new location is not actually a different location, but it is the same location as the original resource host request. The HTTP status code is passed as part of the response by the host server when the requested URI has processed the request and is providing a response to the request to redirect the client to the same URL. For example, the stale host 108 response may include the HTTP status code (e.g., "HTTP/1.1 302 Found") and a location (e.g., "www.example.com/blog/v.5"), the location being the same URI as the URI for the host transmitted in the original request 125.

In the second request attempt 120, the client 101, in response to receiving a redirect response 135, automatically transmits, via a load balancer 105, a second or next request for a resource, where the second request 145 is transmitted to the location instructed in the redirect response (e.g., "Location: www.example.com/blog/v.5"). The second host, updated host 106, which has been updated to receive the most recent deployment for www.example.com and is hosting the requested updated resource blog 104e (i.e., www.example.com/blog/v.5), is then configured to transmit the requested resource to the client, e.g., via a response message 155 including blog 104e.

The hosts 106 and 108 may be configured to process the request and respond to the request, for example, by providing the content of the resource requested or by providing a response message disclosing an error or other action if the server will not or is not able to provide content. For example, in the first request attempt 110, the stale host 108 (located at www.example.com) has not been updated (e.g., has not received the most recent deployment) and, therefore, is unable to provide the requested version of blog 102a.

Note that, while URLs (which specify how to access content, e.g., by specifying a protocol such as HTTP or File Transfer Protocol (FTP)) and URIs are used for the purpose of illustration, other references may be used. Generally, techniques described and suggested herein include uses of URLs and other references to computing resources (generally "resource locators") to enable access to services of a service provider. While URLs are used throughout the present disclosure for the purpose of illustration, it should be understood that the techniques described herein are generally applicable to other resource locators (e.g., instances of information usable by a system to locate a computing resource within the system), such as general URIs. Moreover, the techniques described herein are generally applicable to electronic requests and are not limited to HTTP requests, which are used throughout for illustration.

Figure 2:
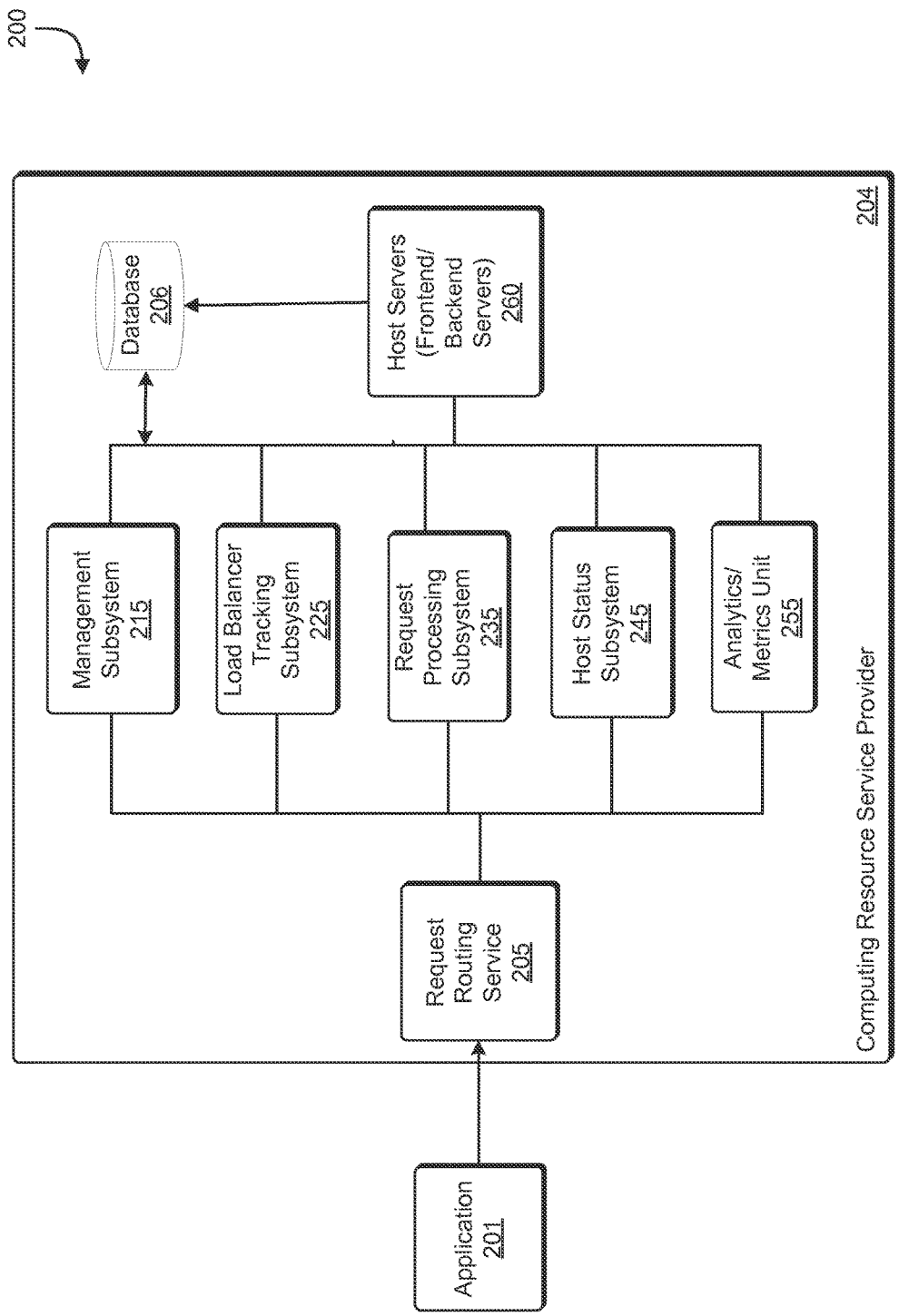
FIG. 2 is an illustrative example of a block diagram illustrating a computing resource service provider and components thereof in which various embodiments can be implemented.

FIG. 2 is an illustrative example of a block diagram 200 for performing protocol redirects in the case of mid-deployment server updates in accordance with at least one embodiment. As illustrated in FIG. 2, the computing resource service provider 204 includes various subsystems, such as a management subsystem 215, a load balancer tracking subsystem 225, a request processing subsystem 235, a host status subsystem 245, and an analytics/metrics subsystem 255.

A computing resource service provider 204 may be a service, such as a web service and/or some other such computing resource service that may manage content, access, policies, users, and/or other such computer system resources for a computer system resource such as a directory service, a web service, and/or some other such computer system resource. The computer system resources that are managed by the computing resource service may be referred to herein as resources, computer system resources, content, assets, and/or other such terms.

The computing resource service provider 204 may further provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 204 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines, such as host servers (frontend/backend servers) 260, may be physical machines located within the computer system environment. In some embodiments, the host machines may be guest virtual machines operating on physical machines located within the computer system environment.

A management subsystem 215 may query a database 206 in order to receive state information corresponding to the one or more hosts, such as host server 260. The state information may include the location of the server, the amount of traffic being directed toward the server, the type of traffic being transmitted to the server, and the like. The host server 260 may be a hardware apparatus, for example, a computer or computer system, and/or may be implemented as a software application running on the computer or computer system.

In various embodiments, the database 206 transmits notifications to the management subsystem 215, indicating that status data has been received from the one or more hosts. The management subsystem 215 may transmit commands to the one or more hosts during the deployment and testing process and may, at some point after transmitting the command, query the database 206 in order to determine the execution of the commands by the one or more hosts.

The request routing service 205 may direct requests using HTTP redirect or other routing techniques. The request routing service 205 may include a load balancer computing system, such as one or more load balancers of the CDN that are configured to perform load balancing algorithms in order to balance traffic across the CDN. The request routing service 205 may be responsible for directing requests to the appropriate host server for processing (e.g., for serving the requested resource to the client). The request routing service 205 may, upon receipt of the request, provision or select a load balancer instance for use in balancing workflow across a network between the application 201 and the host server 260. For example, a provisioning workflow may be followed to provision the load-balancing instance where the load-balancing instance is a virtual computer system configured to perform various operations related to load balancing of traffic requesting resources/assets/content from one or more servers of a network. Although it should be noted that while the term load balancer is used, the load balancer may not balance load among multiple (but may provide load to a single network endpoint, such as a single web server sitting behind the load balancer). Provisioning the load balancer instance may include, for example, selecting an appropriate hardware device able to implement the load balancer instance, loading a machine image of the load balancer instance on the selected hardware, and causing the load balancer instance to launch (e.g., complete a startup process).

The request routing service 205 may transmit information corresponding to the request and the incoming traffic to the frontend and/or backend hosts of a network, such as a content delivery network (CDN), over a connection. The connection may be any suitable connection for transmitting communications between computer systems or within the same computer system such as a network, private network, virtual private network, inter-process communication, service call, function call, or other connection.

In some embodiments, the request routing service 205 may be dynamically configured and may exist prior to the creation of the other entities described herein. As new content management instances are created in response to the creation of content containers and computer system resources, entries in the routing service table may be added to provide access to the content management instances via the provided URI.

The computing resource service provider 204 may also include an analytics/metrics unit 255. The analytics/metrics unit 255 may collect metrics or statistics on the usage of resources allocated to the application 201, the load balancer 225, the host 260, and other relevant subsystems or components. For example, the analytics/metrics unit 255 may collect metrics on the usage of the load balancer and determine what hosts have been updated and what hosts are stale. Further, the metrics collected by the analytics/metrics unit 255 may also be provided to the load balancer tracking subsystem 225 and may be used by the load balancer tracking subsystem 225 to dynamically scale the resources allocated to the application 201.

The load balancer tracking subsystem 225 may include tracking the number of redirects related to a specific client and determining, based at least in part on the type of client (e.g., the specific browser type) how many redirect timeouts are allowed for that client. As the tracking subsystem 225 maintains a count of redirects per client in a table or log, as the used number of redirects reaches the redirect threshold, the subsystem may instruct the load balancer or other component on the server or client side to redirect the next request to a host known to be updated or to a newly deployed server that was released with the current/requested resource. Such example embodiments provide the client with redirect instructions that are likely to reach the requested resource without encountering a server or client error (e.g., an HTTP status code 404 not found error).

In an embodiment, the request processing subsystem 235 is a collection of computing resources, such as load balancers collectively configured to process requests submitted to the host servers (e.g., frontend or backend servers) 260. The request processing subsystem 235, for example, may include one or more load balancers that provide a web service interface to enable customers of a client to submit requests to be forwarded to the host servers. The request processing subsystem 235 may include computer systems configured to make various determinations in connection with the processing of requests, such as a specific host to which to forward the request based on updated state status in light of the deployment status. Example embodiments of the request processing subsystem may include a log maintaining information related to the number of requests processed, the number of redirects processed based at least in part on the location of the redirect, and the like. For example, a host log may receive entries each time a host is determined to be updated or not.

The host status subsystem 245 may also include registering one or more frontend or backend services, such as host servers, with the load balancer where an endpoint is a system (e.g., server) to which the load balancer instance can direct network traffic received by the load balancer. Registering the one or more end points with the load balancer instance may include configuring the load balancer instance to route traffic to the one or more end points in accordance with one or more load balancing algorithms or generally to route network traffic to the one or more endpoints. It should be noted that one or more (perhaps all) of the one or more endpoints may be hosted by the service provider whose service performs the rerouting, for instance, by a virtual computer system service. In some embodiments, one or more (perhaps all) of the endpoints are hosted by another entity, such as a customer of the service provider on premises or by another service provider.

Figure 3:
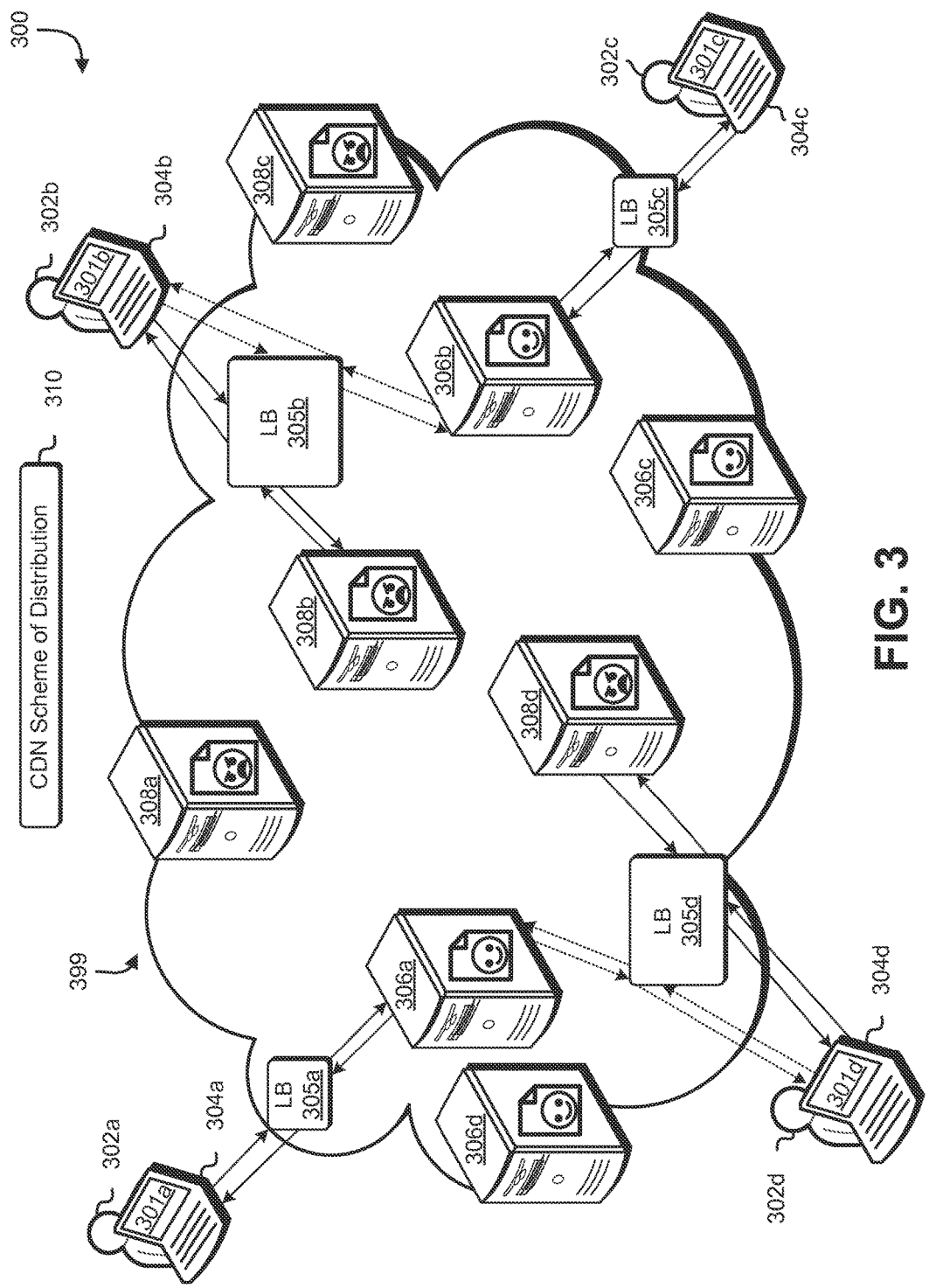
FIG. 3 is an illustrative example of an environment illustrating a content delivery network in accordance with at least one embodiment.

FIG. 3 is an example embodiment of an environment 300 illustrating a content delivery network (CDN) scheme of network distribution in accordance with various embodiments. As will be appreciated, although an Internet environment is used for purposes of explanation, different environments may be used, as appropriate, to implement various embodiments. As illustrated in FIG. 3, the environment includes users 302a-d using user-devices 304a-d to access the Internet 399 via clients 301a-d running on the user-devices, load balancers 305a-d, stale hosts 308a-d, and updated hosts 306a-d. The components of the environment 300 may be implemented on different computer systems that are able to communicate over a network, although components may also be implemented across multiple interconnected CDNs.

In various embodiments, the environment system 300 includes users 302a-302d using user devices 304a-304d, respectively, which are operably interconnected to one or more server apparatuses, such as stale servers 308a-308d and/or updated servers 306a-306d via a network 399, such as the Internet. In the instant example embodiment, the user devices 304a-304d are configured to run a client 301a-301d, such as a web browser, for initiating communication with one or more of the servers, via one or more load distribution systems, such as load balancers 305a-305d.

The computer system client devices 304a-d may be connected to the computer system using one or more networks, such as the network 399, and/or entities associated therewith, such as other servers connected to the network, either directly or indirectly. The computer system client devices 304a-304d may include any device that is capable of connecting with the computer system via a network, including at least servers, laptops, mobile devices such as smartphones or tablets, personal digital assistants (PDA), cell phones, or any wireless application protocol (WAP)-enabled devices or any other computing devices configured to interface directly or indirectly with the Internet, distributed computing systems and components thereof, abstracted components such as guest computer systems or virtual machines, and/or other types of computing devices and/or components. The network 399 may include, for example, a local network, an internal network, a public network such as the Internet, a wide-area network, a wireless network, a mobile network, a satellite network, a distributed computing system with a plurality of network nodes, and/or the like.

The load balancer may be a collection of computing resources collectively configured to receive HTTP requests and direct the HTTP requests to one or more services. The load balancer may also tag requests based at least in part on a number of redirect responses that have been transmitted to a client from any number of hosts. The host servers may be a collection of computing resources collectively configured to receive HTTP requests and direct the HTTP requests to one or more other services of the website. The host servers or components thereof may direct requests using HTTP redirect or other routing techniques. The host servers may be configured to direct requests to the appropriate services of the resource, such as a web page for processing.

The clients 301a-301d may run a network interface application or a software application, which may be, for example, a browsing program to enable users to locate and access information provided by a server, such as a host server 308a-d or 306a-d, depending on the status of the deployment. Such a server may be a web server where the browsing application is primarily configured for use of the World Wide Web but could also access information in private networks or files in file systems. The clients 301a-301d may also run a WAP-enabled browser executing on a cell phone, PDA, other wireless device or the like. The network interface application may allow a user of the client to access, process, and view information and documents available to it from servers in the system, such as the servers 308a-d or 306a-d, depending on the deployment.

In an embodiment, the computing resource service provider (not shown) includes a plurality of host servers (e.g., hosts 306a-306d and hosts 308a-308d), which are illustrative examples of request receiving subsystems of a distributed system, such as content distribution network (CDN) 310. Each host server (such as a service frontend or backend host) may be a computer system, a competing system process, program application, service module or combination of these and/or other such computing system entities. As an illustrative example, host servers 306a-306d and hosts 308a-308d may be web servers of the CDN. When the CDN 310 is in the process of deploying new or updated software or servers within the network, some of the host servers 308a-308d may be considered to be stale hosts (e.g., hosts that have not received the deployment, have only received a partial deployment, do not contain the most updated files, etc.).

Example embodiments of the CDN 310 may include a large distributed system of servers deployed in multiple data centers across the Internet. The CDN, being operated as a computing resource service provider, is configured to serve content to end-users with high availability and high performance, where resource may be provided to the requesting client from one of many servers in a fleet of servers in the CDN. The servers of the CDN may be configured with the same or different resources, and such resources may include web objects (e.g., text, graphics, scripts, etc.), downloadable objects (e.g., media files, software, documents, etc.), applications (e.g., e-commerce applications, portals, etc.) and are often referred to as content or assets of the server.

According to example embodiments, each server of a CDN or other fleet of servers, configured behind one or more load distribution systems (e.g., load balancers), may be configured to automatically and permanently issue a redirect instruction described herein, whenever the host does not have access to the asset. In other embodiments, each server may have a redirect instruction as described herein turned-on during certain network periods (e.g., specifically during a deployment or heavy traffic time).

For example, a client, such as client 301b, may transmit, via a load balancing system, such as the load balancer 305b, one or more HTTP requests to a host server, such as host 308b hosting one or more resources. The host server 308b is not able to provide the requested resources, for example, because a software update to hosts 306a-306d and 308a-308d of the CDN 310 is in mid-deployment, where only hosts 306a-306d have been successfully updated. The host server 308b, instead of transmitting an HTTP status code 402 error, responds to the client request with a redirect instruction. The redirect instruction provides a self-redirect to the client, instructing that the client transmit a new request to the same location (e.g., the same URI initially requested).

In response to the redirect instruction received at the client 301b, via the load balancer 305b, the client transmits a second HTTP request for a resource. The second request, being transmitted to the same URI, is again forwarded via the load balancer 305b. In response to the new request, the load balancer, based on a scheduling algorithm, forwards the request to a different host, host 306b. As host 306b has been successfully updated according to the deployment, the host responds, via the load balancer, to the client 301b with the requested resource.

In alternative example embodiments, one or more user devices may be operably interconnected to one or more servers or clusters via a network or intermediary networks. The one or more devices may connect to the servers via one or more clients, where the clients may be the same or different applications and may similarly communicate with other destination devices coupled to the network or intermediary networks.

Figure 4:
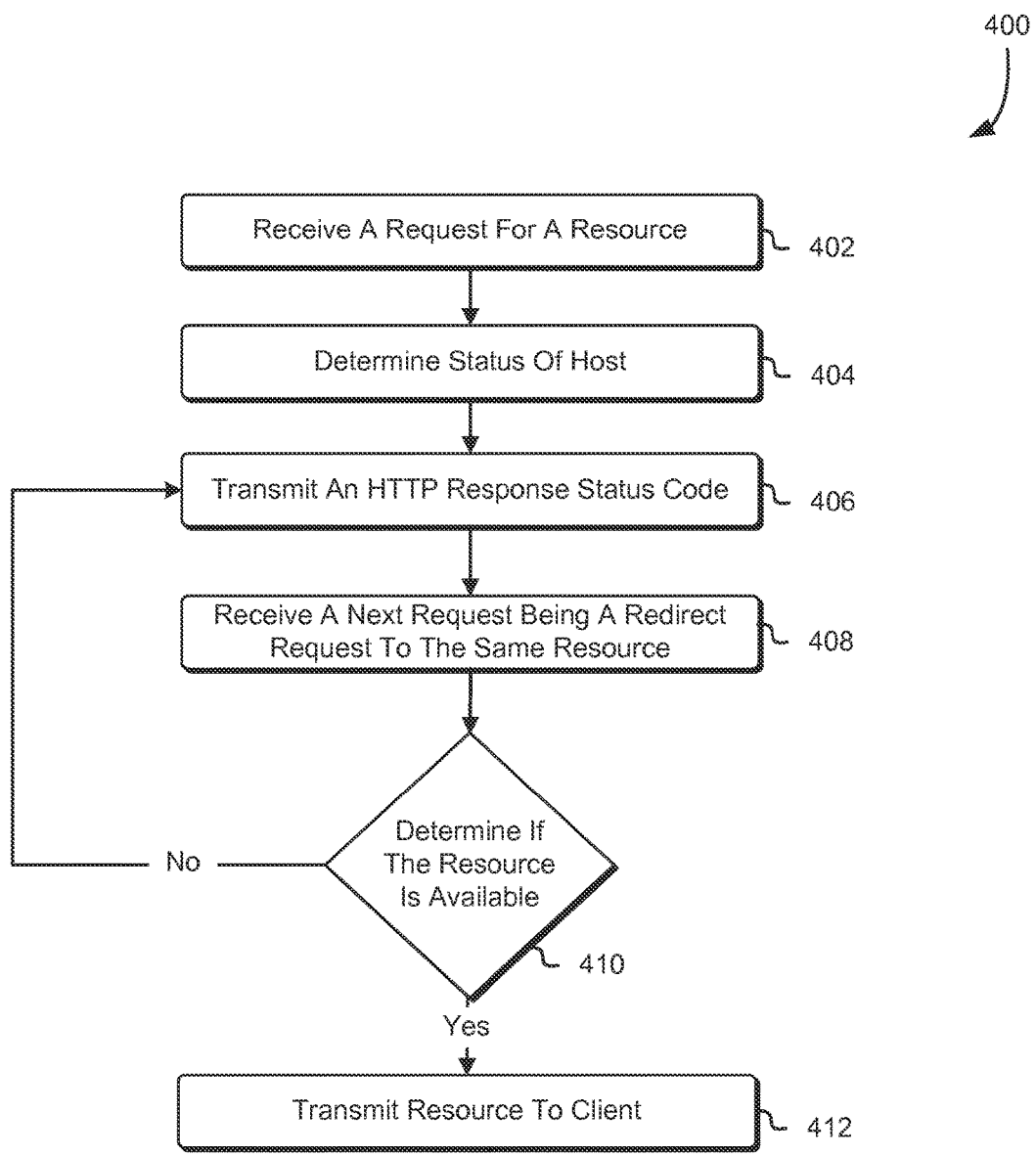
FIG. 4 is an illustrative example of a process for transmitting a redirect request in accordance with at least one embodiment.

FIG. 4 is an illustrative example of a process 400 for receiving a request for a resource and based at least in part on the status of deployment, of transmitting a redirect request to the same resource as the initial resource, in accordance with some embodiments. The process 400 may be done by a server-side host, such as any of the hosts 308 as depicted and described in connection with FIG. 3 or a suitable component thereof. Some or all of the process 400 may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, or in the form of a computer program comprising a plurality of instructions executable by one or more processors. The computer-readable storage medium may be non-transitory.

As illustrated in FIG. 4, the process 400 may include a host server receiving a request for a resource (402) from a first entity, such as a client or an intermediary host of a network, via a load balancer. The request may be received in various ways in accordance with various embodiments such as by way of an application programming interface (API) call to the virtual computing system service. The host determines its status in response to a deployment period, for example, during a mid-deployment scenario, a host must determine if a resource is available (e.g., updated) on the host (404). The host transmits a response code via a load balancer, where the response code may be an HTTP status response code (406). For example, the host, if it determines that the resource is not available, may transmit an HTTP status code 302 Found with instructions to the client to transmit a next request to a given location, where the given location is the same location as the original request.

The process 400 further receives a next request, at a host, for the resource (408), where the host may be the same or, more likely, a different host that hosts the resource at the same location (e.g., the same URL may lead to any number of hosts hosting a resource in a network). The next host determines if the resource is available on that host (410). If the resource is available, the host transmits the resource to the client (412). If the host determines the resource is not available (e.g., the host has not received the most recent deployment or has not received updates to the specific resources), the host transmits a next HTTP response status code (406).

The host receives an update (408). For example, a deployment activity (e.g., an update) is performed on the host, such that the host is updated with the resource being requested.

In alternative example embodiments, a redirect instruction may be transmitted from a server, even when the server has an updated version of the requested resource. For example, if a host server of a fleet of servers is receiving, from a load balancer, a large number of requests or requests that require a large asset (e.g., 1 GB file) to be downloaded from the server, the host may issue a redirect instruction. In such an example embodiment, a limiting factor is not that the server cannot provide the asset, as the asset is cached in the memory of the server. The limiting factor may be that the resource being requested is expensive (e.g., bandwidth, CPU). In such a limiting situation, the host may serve a redirect instruction to a different host, in order to rebalance the load.

Figure 5:
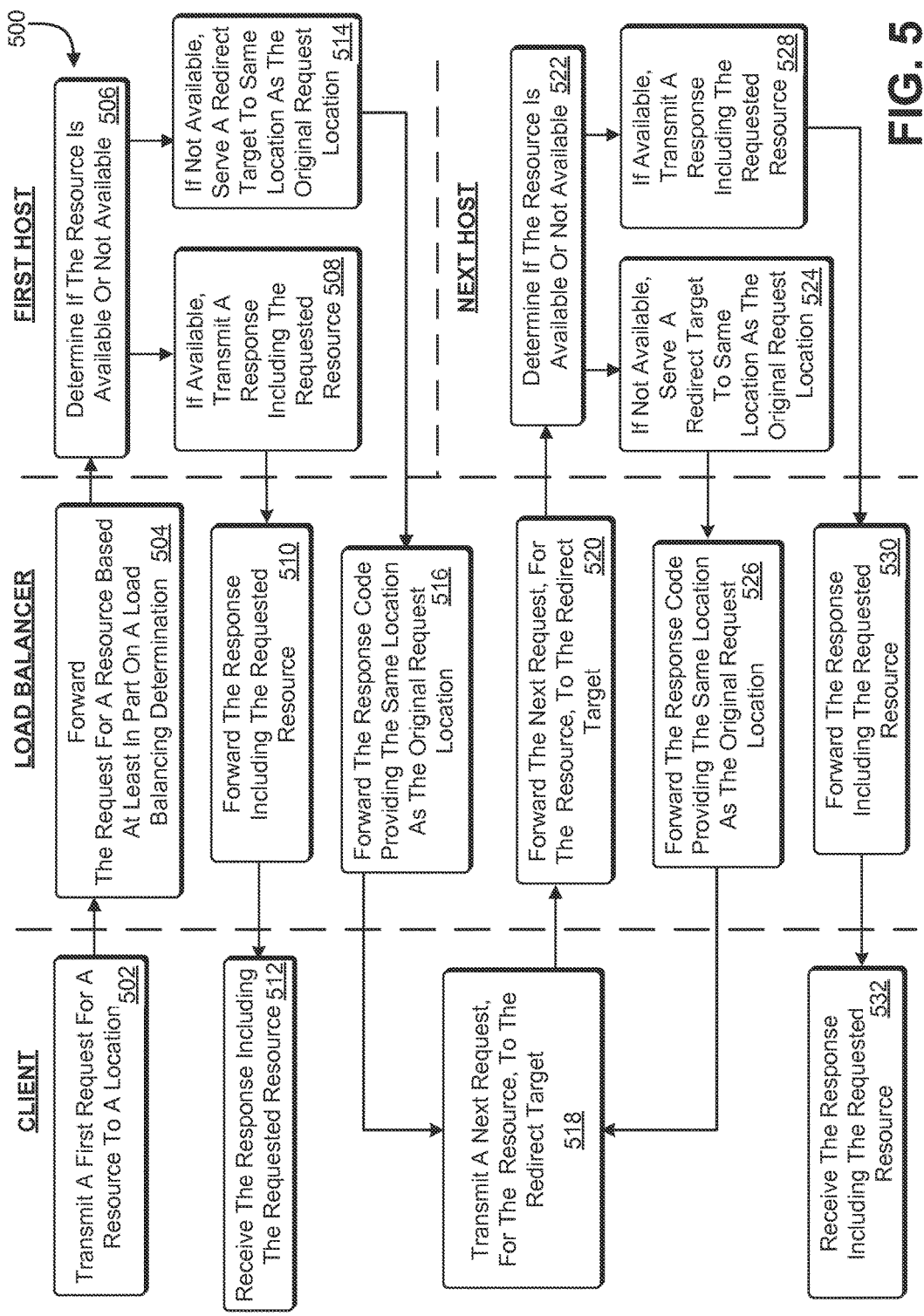
FIG. 5 is an illustrative example of a swim diagram for transmitting requests and redirect responses in accordance with at least one embodiment.

FIG. 5 is a swim diagram illustrating a process 500 for transmitting requests and receiving redirect responses in accordance with at least one embodiment. The process 500 may be performed, for example, by various components of a content delivery network (CDN) described and illustrated in connection with FIG. 3. For example, the process 500 may be performed by a client, such as the web browser 101, a load distribution system, such as the load balancer 105, and two or more host servers, such as a stale host 108 and an updated host 106 all described and depicted in connection with FIG. 1 or a suitable component thereof.

Returning to FIG. 5, the process 500 includes at step 502, a client transmitting a first request for a resource to a location of a host server. In step 504, the load balancer forwards the first request for a resource to a first host, based at least in part on a load balancing determination. The load balancer may, for example, sit in a network of computing devices of a computing resource service provider and one or more network appliances may be configured to route traffic to an Internet protocol (IP) address of the load balancer received, over the Internet, or across another network to the load balancer to enable the load balancer to operate and route the traffic accordingly.

The first host receives the first request, via the load balancer, at step 506, and determines if the requested resource is or is not available at the first host. If the resource is available, at step 508, the first host transmits a response including the requested resource to the load balancer, where the load balancer could be the same, or a different load balancer than the load balancer that forwarded the first request. The load balancer, at step 510, forwards the response, from the first host to the client, including the requested resource, and, at step 512, the client receives the response.

Returning to step 506, if the first host determines that the resource is not available, the first host serves a redirect response, at step 514, to the client directing the client to issue a next request for the resource to the same location target as in the original request. The load balancer, at step 516, forwards the redirect response to the client, where the redirect response generally includes a response status code (e.g., an HTTP 302 Found). At step 518, the client transmits a next request, based on the redirect response, to the target provided in the redirect instructions from the first host. A load balancer, which may be the same or a different load balancer within the network, at step 520, forwards, to a next host, the next request for the same resource to the same location.

At step 522, the next host again determines if the requested resource is available. If, at step 528, the next host determines that the requested resource is available (e.g., the next host has been updated in response to the new deployment), the host transmits the response to a load balancer, and the load balancer, at step 530, forwards the response to the client. The client receives the requested resource at step 532.

At step 524, if the next host determines that the requested resource is not available (for example, the host has not been updated based on the current deployment), the next host serves a redirect response to the client instructing the client to execute a next request to a redirect target, where the redirect target is the same location as made in the original request. The load balancer, at step 526, forwards the redirect response to the client, where the redirect response generally includes a response status code (e.g., an HTTP 302 Found). The redirect loop continues to step 518, where the client again transmits a next request.

In example embodiments of the swim diagram 500, a redirect loop is continuously performed until the client is connected with an updated host and receives the requested resource. In other embodiments, the redirect loop may fail or complete based on a browser timeout; for example, different web browsers may only follow a certain number of redirect responses before the browser will issue a timeout and provide the user with a different type of HTTP error message, such as an HTTP status code 404 Not Found error message.

In alternative example embodiments, a computer system entity, user, or process may connect to a computer system through a computer system entity, such as an intermediary host, and may request access via connection to one or more computer system services. In alternative example embodiments of the process 500, a first entity may connect to a second entity via a load balancer, where the first and second entities may be intermediary hosts or servers within a request path of a network. For example, instead of a client transmitting a request to a server, an intermediary server may transmit a request to a backend server, and a response from the server according to the redirect method would be transmitted from the backend server to software of the intermediary server requesting the resource.

Some or all of the process 500 may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 6:
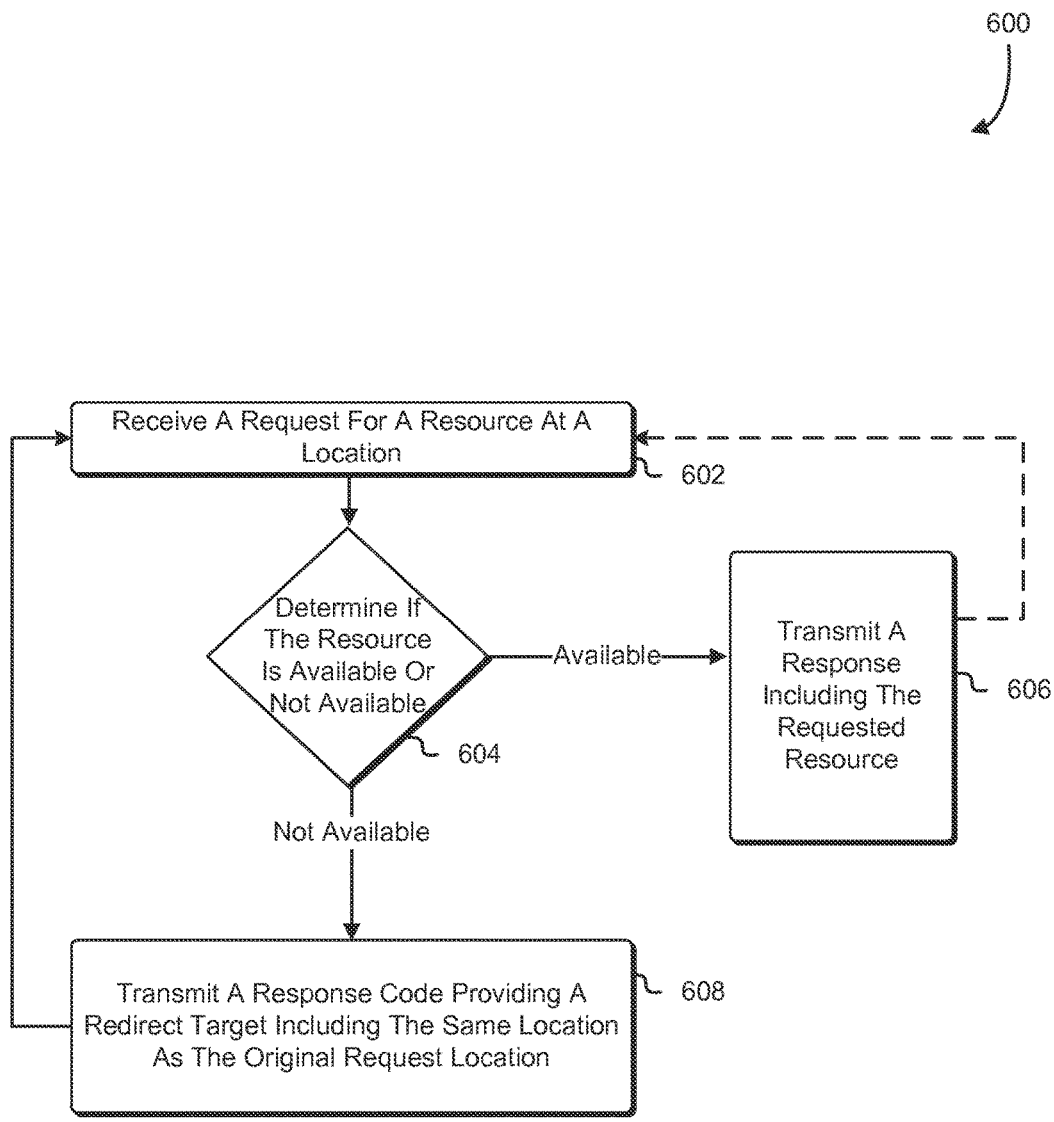
FIG. 6 is an illustrative example of a process for determining if a resource is updated or stale in accordance with at least one embodiment.

FIG. 6 is an illustrative example of a process for determining if a resource is updated or stale in accordance with at least one embodiment. The process 600 may be performed by a processor, such as the host status subsystem 245 depicted and described in connection with FIG. 2 or a suitable component thereof. Some or all of the process 600 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

Returning to FIG. 6, in an embodiment, the process 600 includes receiving a request for a resource, from a client, application, or external server, at a host server (602) of a computing resource service provider. In an embodiment, the service provider may include a plurality of service frontend and/or backend hosts (e.g., servers such as servers 306a-d and 308a-d as described and depicted in connection with FIG. 3) of a website, which are illustrative examples of request receiving subsystems of a distributed system (such as a content delivery system). Each service host may be a computer system, a competing system process, a program application, a service module, or a combination of these and/or other such computing system entities. As an illustrative example, a service host may be a web server of the computing resource service provider network. The service frontend and backend hosts may be, from the perspective of the customer network (e.g., an enterprise network), behind a load balancer such that requests made from the customer network may be routed to any of the service frontend and backend hosts via the load balancer, which may provide redundancy for the purpose of handling load resulting from use by multiple customers of the service provider.

Returning to FIG. 6, the process 600 includes the host server determining if the requested resource is available at that location (604). If the resource is available, for example, the host has received the most recent deployment; the host may transmit a response, via a load balancer, including the requested resource, to the client (606). If, however, the resource is unavailable at the host location, for example, the host has not received the most recent deployment, and is therefore not maintaining the requested resource, the host transmits a response status (608).

The host may respond to the client, via a load balancer, with a response code indicating a desired action is to be performed on an identified host (e.g., an HTTP response code 302 Found, which normally (as known) identifies that the uniform resource identifier (URI) requested has been found but is located at a different location). The HTTP response code 302, in the process 600 provides a response to the client, inviting the client to make a second or additional, otherwise identical, request to the same URI specified in the original request.

In some example embodiments, after the requested resource is transmitted to the client (606), the client may transmit a next request (as indicated by the dashed arrow) between steps 606 and 602. For example, the same client or different clients may continuously request different resources and each time a new resource is requested, the process 600 may be repeated. For example, when a different client has requested an asset (e.g., a file, content, web page, etc.) during a mid-stage deployment, in the place of transmitting an HTTP 404 Not Found error message from the stale (e.g., not updated) host, the host transmits a redirect response to the client that causes the client to transmit a next request identical to the first request.

In alternative example embodiments, the load balancer forwarding the request from the client to the server may be a persistent or "sticky" load balancer, for example, in a stateful web service. Generally, a sticky load balancer performs by consistently forwarding each request from the user, in the same user session, to the same server. However, according to example embodiments, the server may include header information in response to a request that directs the client not to transmit the request to the same server when that server does not have the requested resource. In other words, when a load balancer is a persistent load balancer, the redirect response may still be transmitted when the resource is not available (in place of the HTTP 404 Not Found error) in order to ensure that the client does not send a request to the same server. In example embodiments that include a stateless web service, the load balancer may also direct the client, using header information in the response message, not to transmit the request to the same server when that server does not have the requested resource.

Figure 7:
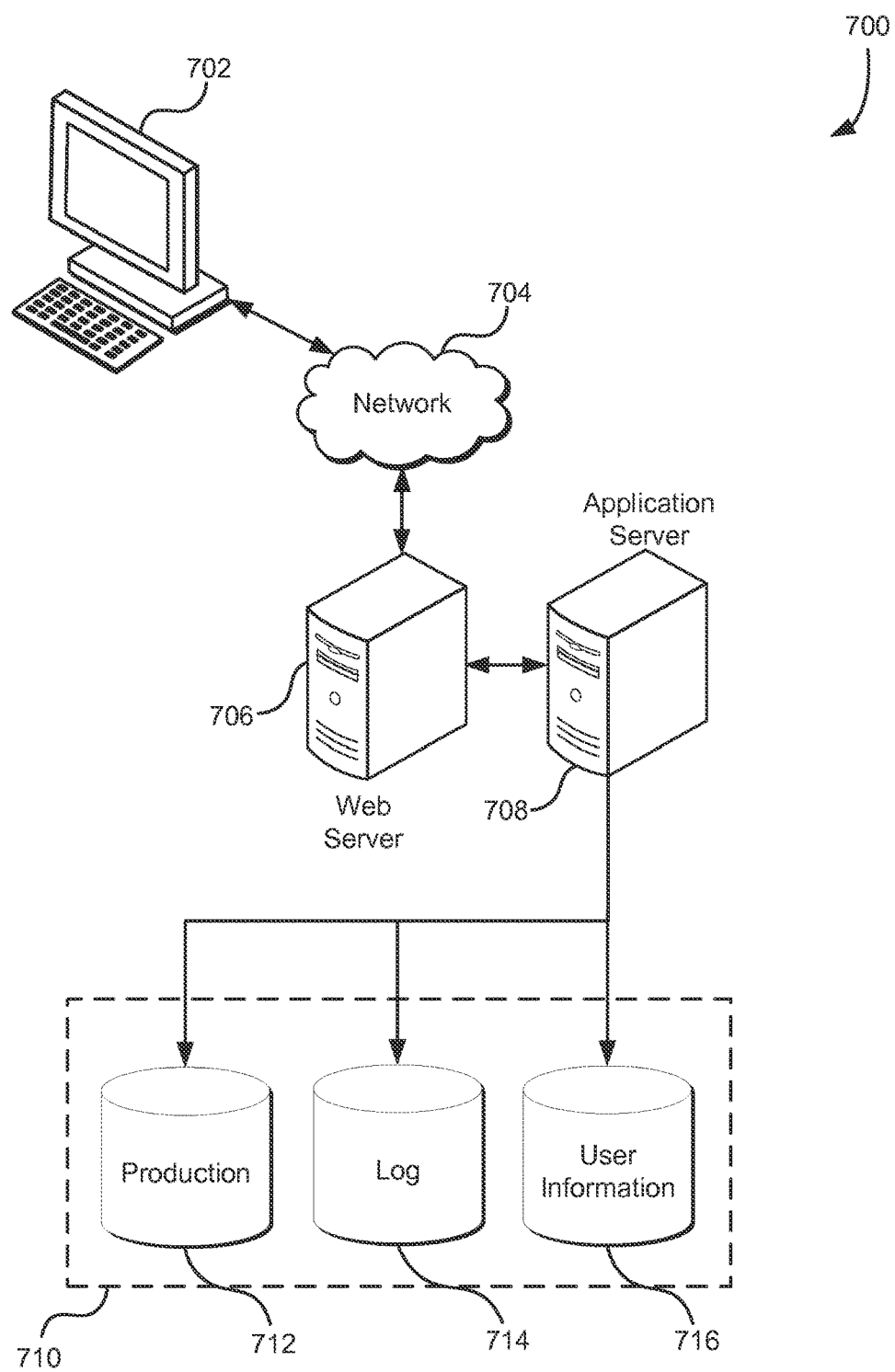
FIG. 7 is an illustrative example of an environment in accordance with at least one embodiment.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   determining, by a server and based at least in part on an update status of a resource, that the resource is at least temporarily inaccessible at a location identified in a first request for the resource, wherein the first request is from a requestor; and
   responding, by the server and based at least in part on a redirection parameter associated with the resource, to the first request with a redirect instruction to initiate a second request identifying the location, wherein the redirection parameter identifies at least the update status of the resource.

2. The computer-implemented method of claim 1, wherein the redirection parameter indicates a pending deployment.

3. The computer-implemented method of claim 1, wherein the location corresponds to a plurality of redundant web servers.

4. The computer-implemented method of claim 1, further comprising updating the redirection parameter to cause the redirect instruction to not be provided in a response to a third request for the resource.

5. The computer-implemented method of claim 1, wherein the first request is a Hypertext Transfer Protocol request.

6. The computer-implemented method of claim 1, wherein responding to the first request comprises transmitting the redirect instruction to a load balancer.

7. The computer-implemented method of claim 1, wherein the location is specified by a path in a resource locator.

8. A system, comprising:
   memory to store instructions executable by one or more processors to cause the system to at least:
   receive a request identifying a location of a resource; and
   if the resource is determined, by a server and based at least in part on an update status of the resource, to be at least temporarily inaccessible and if a redirection parameter has a first state, respond by the server to the request with a redirect instruction to initiate a second request identifying the location, wherein the first state indicates the update status of the resource, and wherein the request is from a requestor.

9. The system of claim 8, wherein the system comprises a load balancer.

10. The system of claim 9, wherein the system comprises multiple web servers registered with the load balancer.

11. The system of claim 10, wherein the request is received by a first web server and the load balancer utilizes a load balancing algorithm that results in a nonzero probability that a second web server receives the second request.

12. The system of claim 8, wherein the instructions are further executable to cause the system to change the redirection parameter to a second state that causes the redirect instruction to not be sent if the resource is inaccessible.

13. The system of claim 8, wherein the system comprises multiple redundant servers.

14. The system of claim 8, wherein the instructions are executable to cause the system to provide the resource if the resource is determined to be accessible.

15. A non-transitory computer-readable storage medium having stored thereon instructions that, if executed by one or more processors, cause a computer system to at least:
   determine, based at least in part on an update status of a resource, that the resource is at least temporarily inaccessible at a location identified in a first request for the resource, wherein the first request is from a requestor; and
   generate a response to the request based at least in part on a redirection parameter associated with the resource to include a redirect instruction to initiate a second request identifying the location, wherein the redirection parameter indicates the update status of the resource.

16. The non-transitory computer-readable storage medium of claim 15, wherein the instructions, if executed by the one or more processors, cause the computer system to generate the response to lack the redirect instruction if the resource is determined to be accessible.

17. The non-transitory computer-readable storage medium of claim 15, wherein the redirection parameter is selectively settable to determine whether responses include the redirect instruction.

18. The non-transitory computer-readable storage medium of claim 15, wherein the redirect instruction comprises a Hypertext Transfer Protocol status code that specifies the location.

19. The non-transitory computer-readable storage medium of claim 15, wherein, if the redirection parameter has a particular state, the instructions, if executed by the one or more processors, cause the computer system to transmit an error message instead of the redirect instruction.

20. The non-transitory computer-readable storage medium of claim 15, wherein the response further comprises information that indicates to a load balancer to direct the second request to another computer system.

* * * * *